United States Patent
Duhon et al.

(10) Patent No.: US 7,041,356 B1
(45) Date of Patent: May 9, 2006

(54) PORTABLE CHEMICAL SPILL CONTROL DEVICE

(76) Inventors: David M. Duhon, 1040 Holly Dr., Lake Charles, LA (US) 70601; Don E. Page, Jr., 2201 W. Parkway, Groves, TX (US) 77619

(*) Notice: Subject to any disclaimer, the term of this patent is extended or adjusted under 35 U.S.C. 154(b) by 0 days.

(21) Appl. No.: 10/940,005

(22) Filed: Sep. 13, 2004

Related U.S. Application Data

(60) Provisional application No. 60/502,997, filed on Sep. 15, 2003.

(51) Int. Cl.
*B32B 3/06* (2006.01)

(52) U.S. Cl. .................... 428/102; 141/86; 141/98; 184/106; 428/121; 428/192; 428/64.1; 428/66.7

(58) Field of Classification Search ............... 428/102, 428/121, 192, 64.1, 66.7; 141/98, 86; 184/106
See application file for complete search history.

(56) References Cited

U.S. PATENT DOCUMENTS 5,785,106 A * 7/1998 Hwang .................. 160/370.21

* cited by examiner

*Primary Examiner*—Patrick Joseph Ryan
*Assistant Examiner*—Jane Rhee
(74) *Attorney, Agent, or Firm*—Garvey, Smith, Nehrbass & North, L.L.C.; Charles C. Garvey, Jr.

(57) ABSTRACT

A portable chemical spill control device includes an expansive sheet of absorbent material having upper and lower surfaces and a periphery that defines a circumference. The sheet of material is of a material that is resistant to fluid attacks so that spills deposited upon the upper surface are contained on the upper surface. A peripheral bead includes a foldable portion that extends around the expansive sheet of material, the bead including an elongated tensile member and a folded portion that holds the elongated tensile member to the absorbent sheet of material. A connection joins the peripheral bead to the expansive sheet of absorbent material in a configuration that envelops the tensile member with the foldable portion. The elongated tensile member can be moved between open and folded positions wherein the tensile member subjects the expansive sheet of material to tension in an open position that maximizes its circumference, and wherein in the folded position the tensile member folds to provide multiple loops.

16 Claims, 6 Drawing Sheets

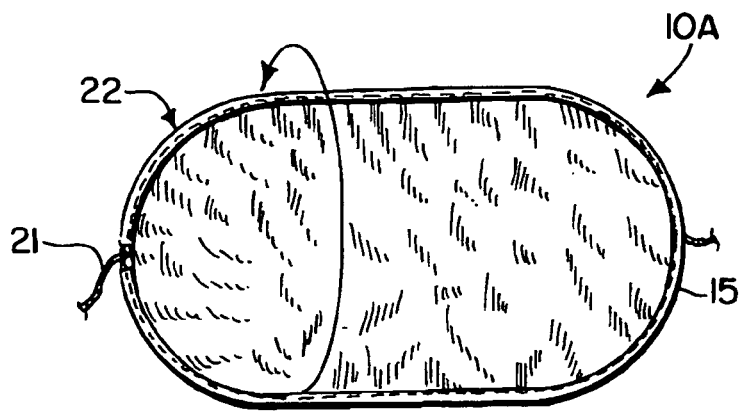
FIG. 16.
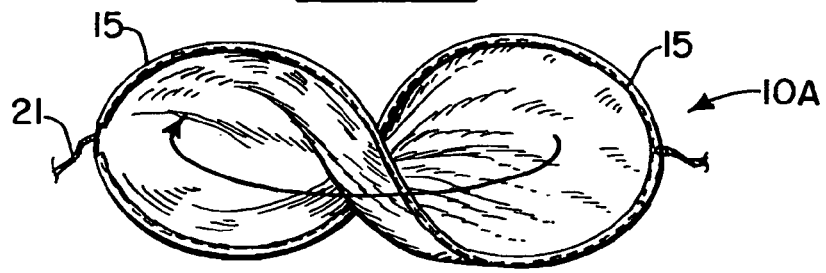
FIG. 17.
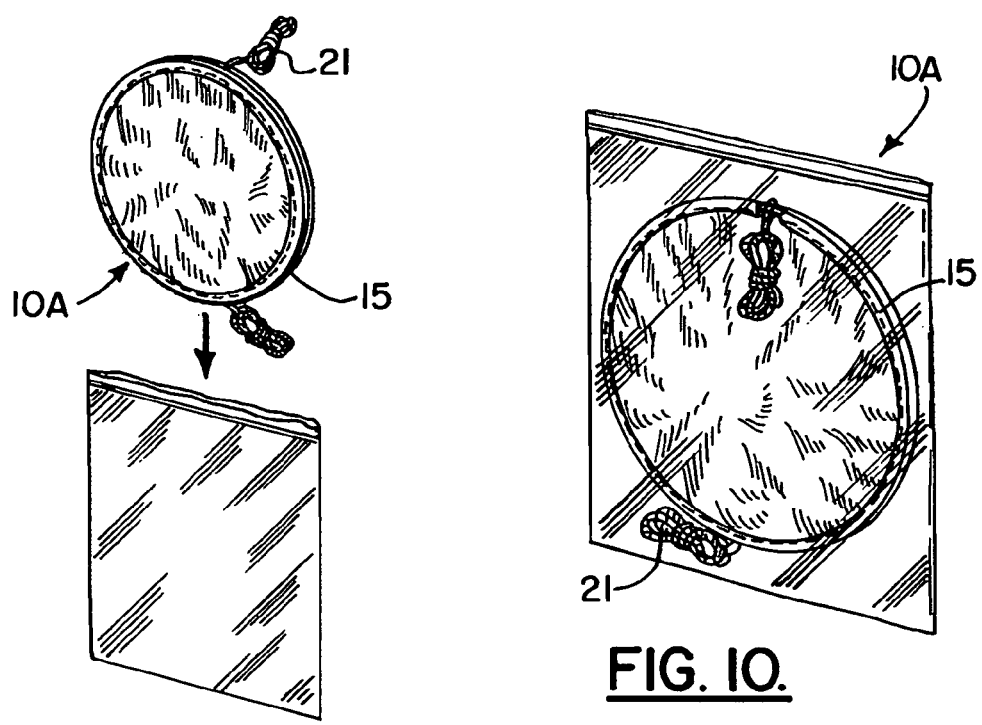
FIG. 18.
FIG. 10.

PORTABLE CHEMICAL SPILL CONTROL DEVICE

CROSS-REFERENCE TO RELATED APPLICATIONS

Priority of U.S. Provisional Patent Application Ser. No. 60/502,997, filed Sep. 15, 2003, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to portable chemical spill control devices in the form of a foldable mat that can be positioned under a selected vehicle such as a truck, van, forklift or the like. Even more particularly, the present invention relates to an improved foldable portable chemical spill control device that features a central absorbent cushion having an extended position periphery that contains a spring (preferably a spring steel rod) wherein the spring steel rod enables the device to be folded into a smaller package that is defined by multiple circular wraps of the spring steel rods.

2. General Background of the Invention

Many vehicles carry fluid that can inadvertently leak with the vehicle is parked. Common examples include trucks, vans, automobiles, motorcycles, forklifts, construction equipment, earth movers and other equipment. Such devices can leak materials that are hazardous to the environment such as oil, gasoline, power steering fluid, grease, gear oil, brake fluid and the like.

Patents have been issued for spill control devices in the form of a mat that can be positioned under a selected vehicle, truck, van, forklift or the like.

Examples of such patents are listed in the following table:

| PATENT NUMBER | TITLE | ISSUE DATE |
|---|---|---|
| 3,722,626 | CAR PORT OIL DRIP MAT | Mar. 27, 1973 |
| 4,801,005 | OIL DRIPPING ABSORPTION AND CONTAINMENT KIT | Jan. 31, 1989 |
| 5,080,956 | OIL ABSORBENT MAT WITH SPILL CHANNELING MEANS | Jan. 14, 1992 |
| 5,597,418 | METHOD OF MAKING FOLDABLE MAT FOR ABSORBING LIQUIDS | Jan. 28, 1997 |
| 5,834,104 | FLUID ABSORPTION MAT | Nov. 10, 1998 |
| RE37,295 E | WATER AND/OR OIL IMPERMEABLE SEALING MAT CONSISTING SUBSTANTIALLY OF A SUBSTRATE LAYER, A LAYER OF SWELLABLE CLAY AND A COVER LAYER | Jul. 24, 2001 |
| 6,439,492 | VEHICULAR FLUID ABSORBENT PAD | Aug. 27, 2002 |
| 6,451,405 | OIL TARP ASSEMBLY FOR HEAVY MACHINERY | Sep. 17, 2002 |
| 6,475,594 | SORBENT MAT ASSEMBLY | Nov. 5, 2002 |

BRIEF SUMMARY OF THE INVENTION

The present invention provides an improved portable chemical spill control device that includes an expansive sheet of material having upper and lower surfaces and a periphery. The sheet of material is resistant to chemical fluid attack so that spills deposited upon the surface are contained on the upper surface.

A peripheral bead can include a foldable portion that extends around the expansive sheet of material at its periphery, the bead including an elongated tensile member and a portion (e.g. folder portion) that holds or contains the elongated tensile member.

A connection joins the peripheral bead to the expansive sheet of material in a configuration that can envelop the tensile member with the foldable portion.

The elongated tensile member can be moved between open and folded positions, wherein the tensile member subjects the expansive sheet of material to tension in the open position and maximizes its circumference. In the folded position, the tensile member can be folded to provide multiple loops.

BRIEF DESCRIPTION OF DRAWINGS

For a further understanding of the nature, objects, and advantages of the present invention, reference should be had to the following detailed description, read in conjunction with the following drawings, wherein like reference numerals denote like elements and wherein:

FIGS. 10–18 show another preferred embodiment, similar to that shown in FIGS. 1–9, but one in which the spring steel rod is replaced with a spring steel band.

DETAILED DESCRIPTION OF THE INVENTION

Figure 1:
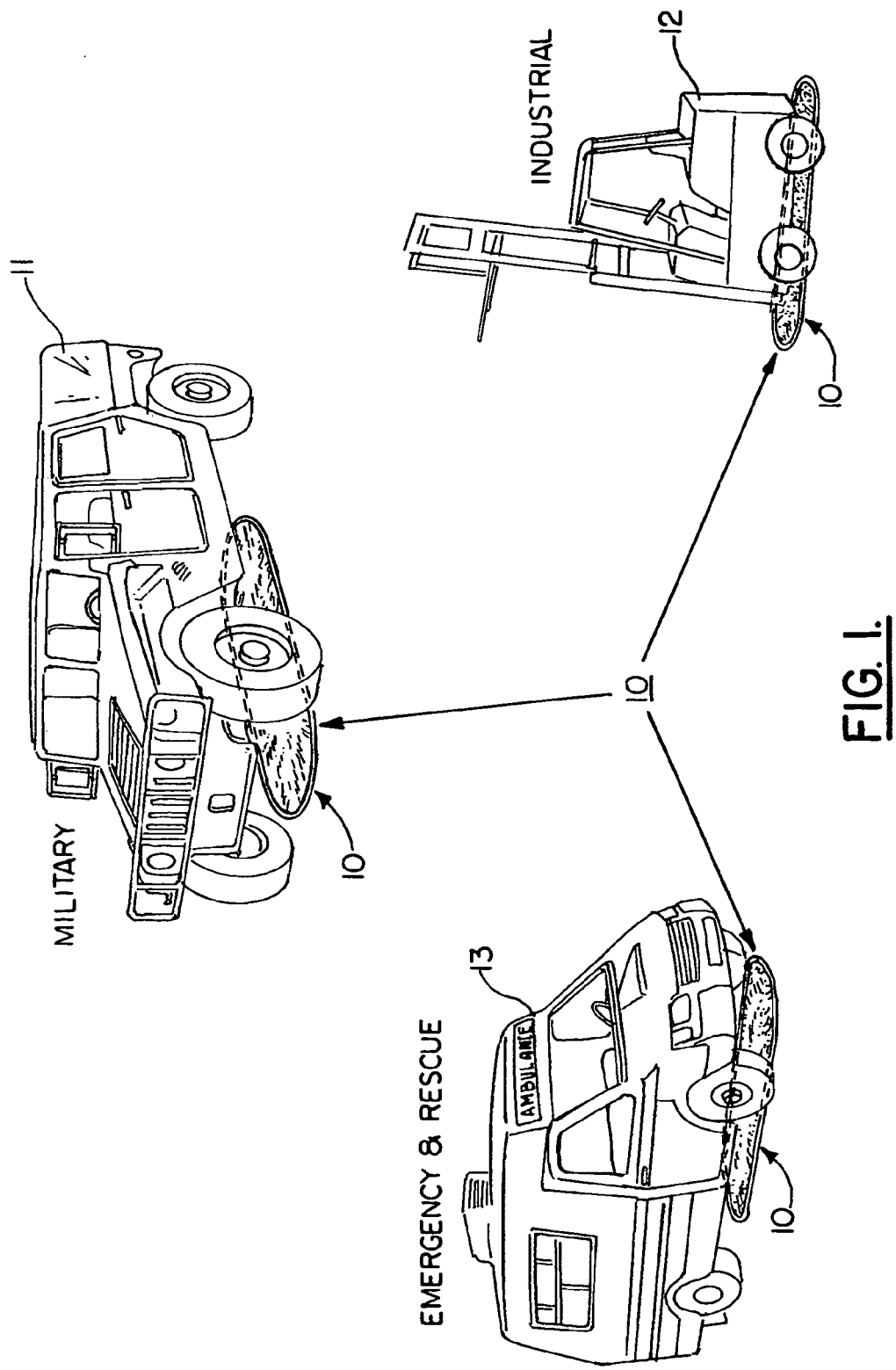
FIG. 1 is a schematic view illustrating various vehicles with the apparatus of the present invention shown in operating position under the vehicle.
Figure 2:
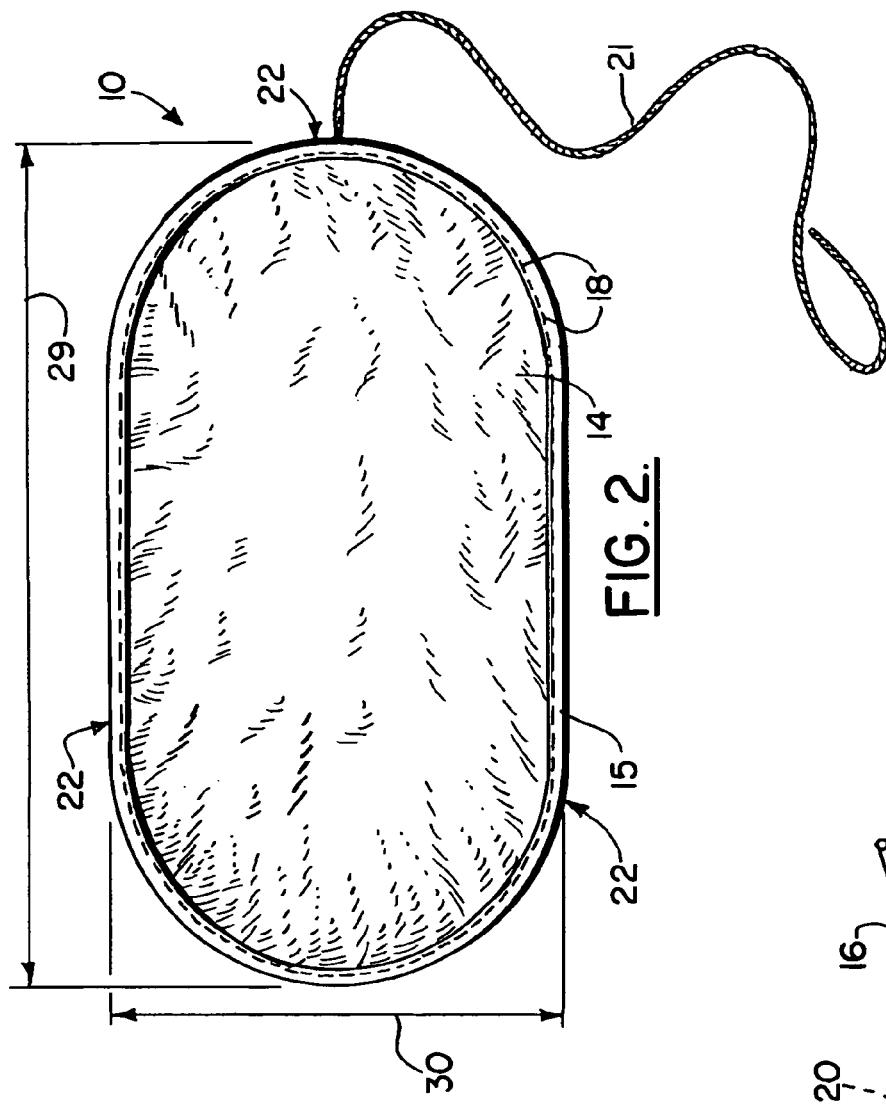
FIG. 2 is a plan view of a preferred embodiment of the apparatus of the present invention.

FIGS. 1–4 show a preferred embodiment of the apparatus of the present invention designated by the numeral 10 in FIGS. 1 and 2. Spill control apparatus 10 is shown in FIG. 1 being positioned under a truck 11, a forklift 12, and van 13 such as an ambulance or other emergency or rescue vehicle. The apparatus 10 includes an absorbent mat 14 surrounded by edging material 15. The absorbent material 14 is preferably a solid sheet of material that absorbs substances that fall upon its upper surface 28. Examples of suitable absorbent material are polypropylene and polypropylene-universal.

Figure 3:
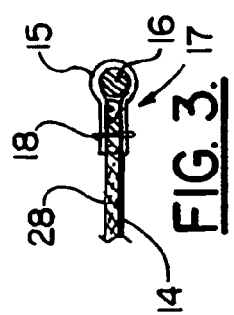
FIG. 3 is a partial sectional view of a preferred embodiment of the apparatus of the present invention showing a cross section edge detail.
Figure 4:
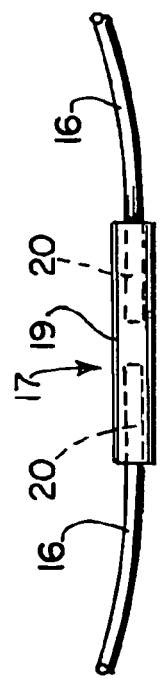
FIG. 4 is a fragmentary view of a preferred embodiment of the apparatus of the present invention showing the rod connector detail.

Edging material 15 envelops spring steel rod 16. Rod 16 can be an elongated rod that is joined using butt connector 19 (see FIG. 4). Butt connector 19 can be provided with sockets 20 that receive an end portion of spring steel rod 16 in each of the sockets 20 as shown in FIG. 4. Stitching 18 can be used to attach edging material 15 to absorbent mat 14 while enveloping spring steel rod 16 as shown in FIG. 3.

In FIG. 2, an expanded position of the apparatus 10 is shown wherein the absorbent mat 14 is at its maximum length 29 and maximum width 30. In FIG. 2, the numeral 22 indicates schematically the extended periphery of spill control apparatus 10. A lanyard 21 can be attached to edging material 15 for withdrawing spill control apparatus 10 from its operating position under a vehicle 11, 12 or 13.

Figure 5:
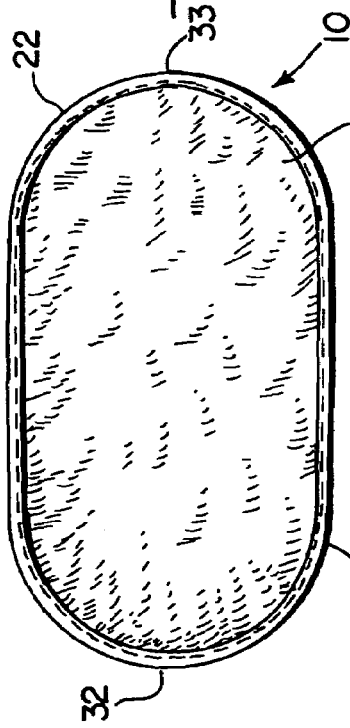
FIGS. 5–9 are sequential views illustrating a folding detail for the apparatus of the present invention.
Figure 6:
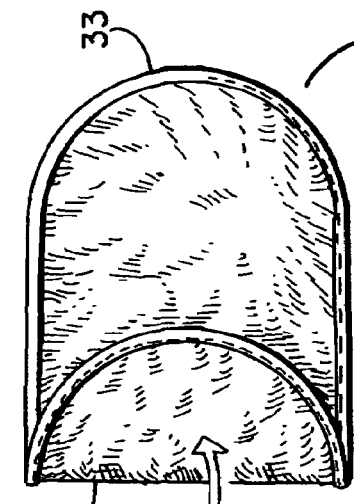
Figure 7:
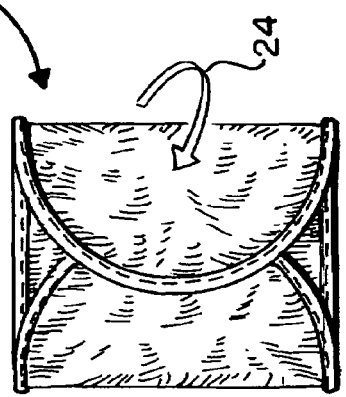
Figure 8:
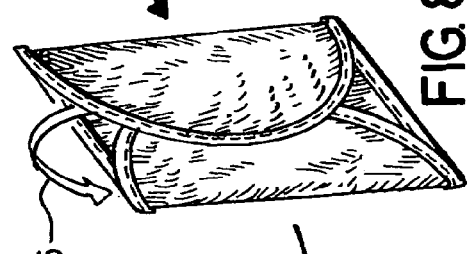
Figure 9:
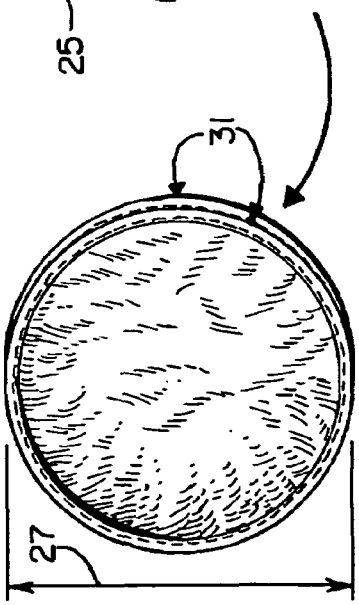
Figure 11:
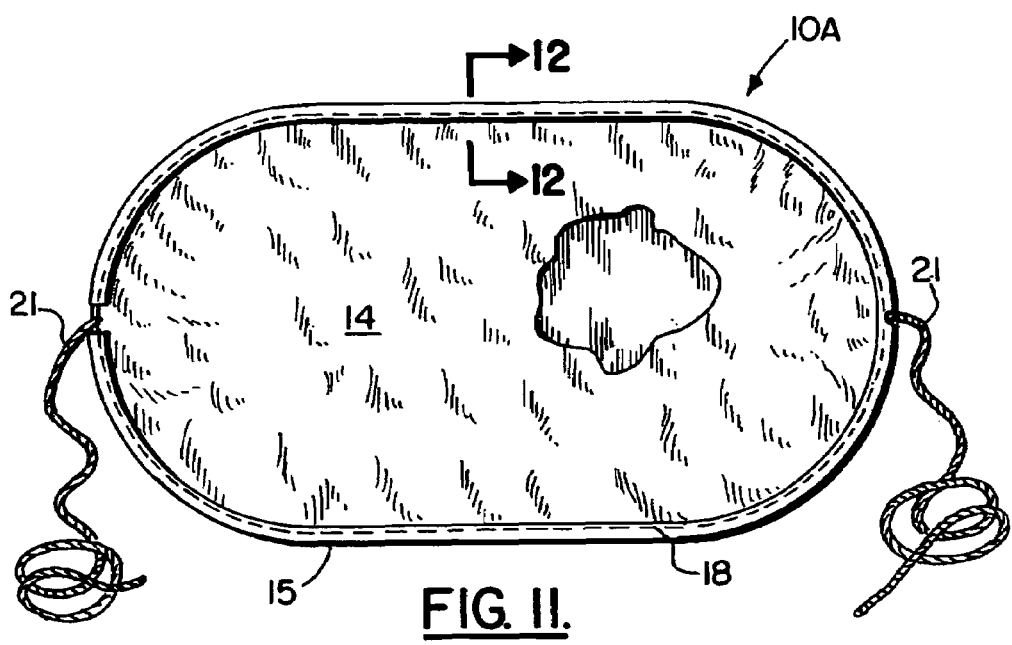
Figure 12:
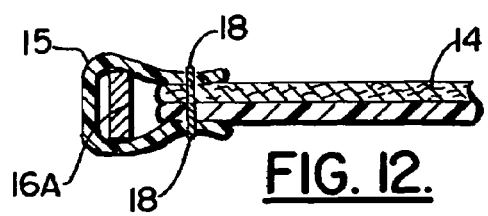
Figure 13:
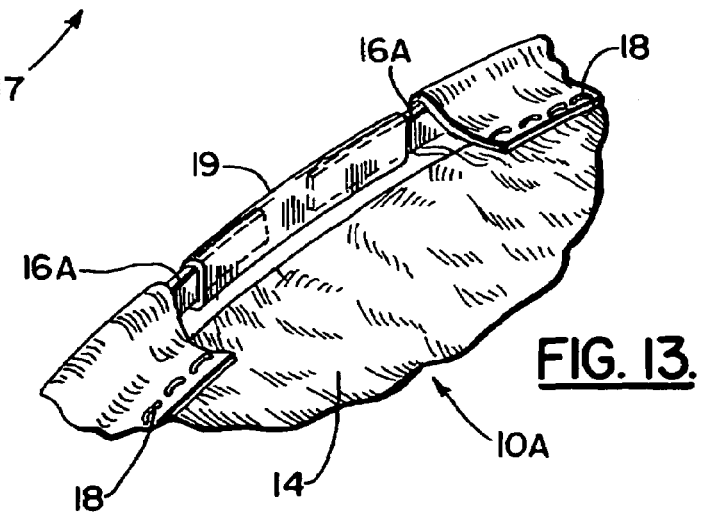
Figure 14:
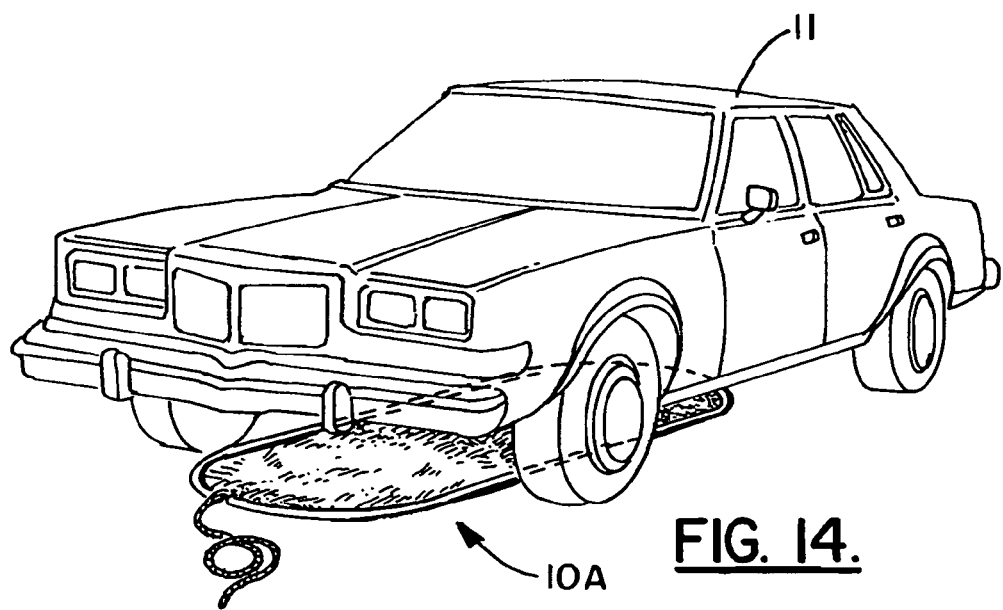
Figure 15:
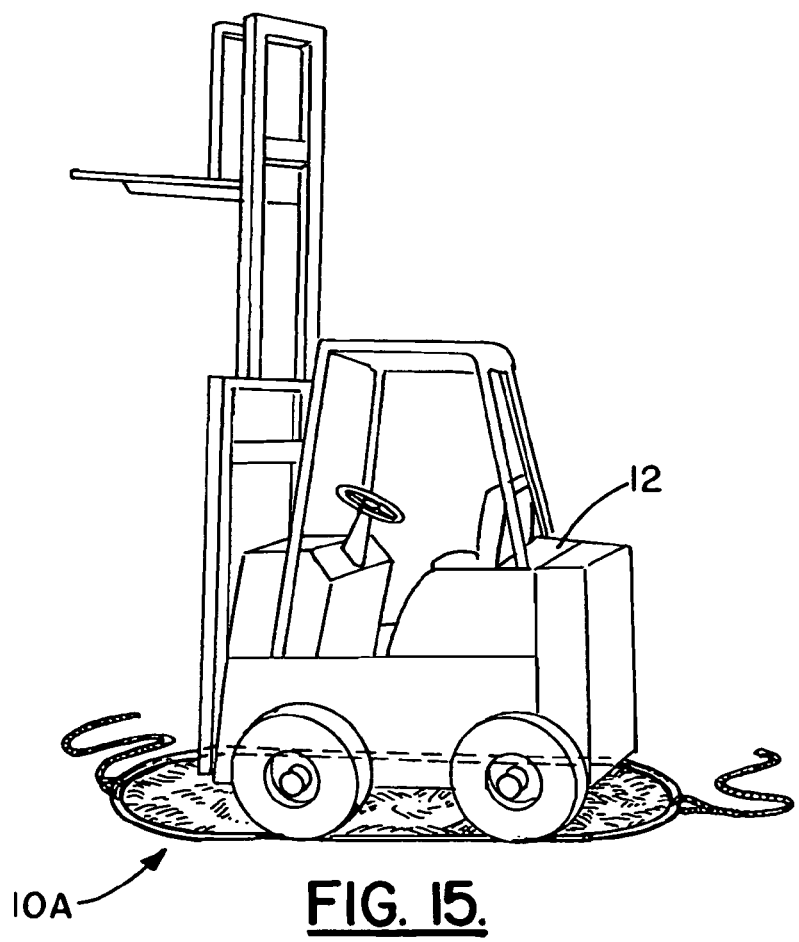

FIGS. 5–9 show a folding detail for folding apparatus 10 beginning at the extended or expanded position in FIG. 5 and continuing until a folded position of FIG. 9 is achieved having folded the diameter 27 and folded outer periphery 31. In order to fold the apparatus, each end 32, 33 is folded inwardly as indicated by the arrow 23 in FIG. 6. Each end has been folded in FIG. 7 as indicated by arrow 24. In FIG. 8, arrow 25 indicates that the apparatus 10 with both ends folded inwardly is then folded in half top to bottom as shown in FIG. 8. The finished folded rounded shape is comprised of a plurality of loops of spring steel rod 16 as shown in FIG. 9 having a periphery 31, a folded periphery 26 of reduced diameter 27.

In FIGS. 10–18, another preferred embodiment, designated generally by the numeral 10A, a spring band 16A replaces the spring steel rod 16 of FIGS. 1–9.

PARTS LIST

The following is a list of parts and materials suitable for use in the present invention:

| Parts Number | Description |
| --- | --- |
| 10 | spill control apparatus |
| 11 | truck or vehicle |
| 12 | forklift |
| 13 | van |
| 14 | absorbent mat |
| 15 | edging material |
| 16 | spring steel rod |
| 16A | spring steel band |
| 17 | joint |
| 18 | stitching |
| 19 | butt connector |
| 20 | socket |
| 21 | lanyard |
| 22 | periphery extended |
| 23 | arrow |
| 24 | arrow |
| 25 | arrow |
| 26 | folded periphery |
| 27 | folded diameter |
| 28 | upper surface |
| 29 | length |
| 30 | width |
| 31 | periphery |
| 32 | end |
| 33 | end |

The foregoing embodiments are presented by way of example only; the scope of the present invention is to be limited only by the following claims.

The invention claimed is:
1. A portable chemical spill control device, comprising:
(a) an expansive sheet of absorbent material having a thickness, upper and lower surfaces and a thickened periphery that defines a circumference and a fluid retaining barrier for retaining fluids on the sheet of material that fall on the sheet of material, the sheet of material being resistant to chemical fluid attack so that spills deposited upon the upper surface are contained on the upper surface and inside the barrier;
(b) the barrier including a peripheral bead that includes a foldable portion that extends around the expansive sheet of material, said bead including a single, peripherally placed elongated tensile member that is thicker than the thickness of the expansive sheet of absorbent material, and a folded portion that holds the elongated tensile member to the absorbent sheet of material;
(c) a connection that joins the peripheral bead to the expansive sheet of material in a configuration that envelops the tensile member with the foldable portion;
(d) wherein the elongated tensile member can be moved between "open" and "folded" portions, wherein the tensile member subjects the expansive sheet of material to tension in said open position that maximizes the circumference of the expansive sheet of material, and wherein in said folded position the tensile member folds to provide multiple loops.

2. The portable chemical spill control device of claim 1 wherein the tensile member is of a metal material.

3. The portable chemical spill control device of claim 2 wherein the tensile member is steel.

4. The portable chemical spill control device of claim 1 wherein the expansive sheet of material is of a polypropylene material.

5. The portable chemical spill control device of claim 1 wherein the connection includes stitching.

6. The portable chemical spill control device of claim 3 wherein the tensile member is a spring steel rod.

7. The portable chemical spill control device of claim 4 wherein the sheet of material is a polypropylene-universal material.

8. The portable chemical spill control device of claim 1 wherein the expansive sheet of material defines an oval shape when in an opened position.

9. A portable chemical spill control device, comprising:
(a) an expansive sheet of absorbent material having a thickness, upper and lower surfaces and a thickened periphery that defines a circumference and a fluid retaining barrier for retaining fluids on the sheet of material that fall on the sheet of material, the sheet of material being resistant to chemical fluid attack so that spills deposited upon the upper surface are contained on the upper surface and inside the barrier;
(b) the barrier including a single endless band tensile member that encircles the expansive sheet of absorbent material, defining generally its periphery and a folded portion that envelops the endless band member and joins it to the expansive sheet of absorbent material;
(c) a connection that joins the folded portion to the expansive sheet of absorbent material; and
(d) wherein the elongated tensile member can be moved between "open" and "folded" portions, wherein the tensile member subjects the expansive sheet of material to tension in said open position that maximizes the circumference of the expansive sheet of material, and wherein in said folded position the tensile member folds to provide multiple loops.

10. The portable chemical spill control device of claim 9 wherein the tensile member is of a metal material.

11. The portable chemical spill control device of claim 9 wherein the tensile member is steel.

12. The portable chemical spill control device of claim 9 wherein the expansive sheet of material is of a polypropylene material.

13. The portable chemical spill control device of claim 9 wherein the connection includes stitching.

14. The portable chemical spill control device of claim 9 wherein the tensile member is a spring steel endless band.

15. The portable chemical spill control device of claim 9 wherein the sheet of material is a polypropylene-universal material.

16. The portable chemical spill control device of claim 9 wherein the expansive sheet of material defines an oval shape when in an opened position.

* * * * *